(12) United States Patent
Freeman et al.

(10) Patent No.: US 8,630,729 B2
(45) Date of Patent: *Jan. 14, 2014

(54) ASSEMBLY TASK VERIFICATION SYSTEM AND METHOD

(75) Inventors: Philip L. Freeman, Maryland Heights, MO (US); Thomas E. Shepherd, St. Louis, MO (US); Christopher K. Zuver, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/486,172

(22) Filed: Jun. 1, 2012

(65) Prior Publication Data

US 2012/0271448 A1 Oct. 25, 2012

Related U.S. Application Data

(62) Division of application No. 11/408,754, filed on Apr. 21, 2006, now Pat. No. 8,200,354.

(51) Int. Cl.
*B25J 5/00* (2006.01)
*B25J 9/18* (2006.01)
*G05B 15/00* (2006.01)
*G06F 19/00* (2011.01)

(52) U.S. Cl.
USPC ........... 700/114; 700/245; 700/258; 700/259; 318/568.11; 318/568.12; 701/468; 701/482

(58) Field of Classification Search
USPC ............. 700/114, 245, 258, 259; 318/568.11, 318/568.12; 701/468, 482; 901/30, 41, 42, 901/44, 46, 47
See application file for complete search history.

(56) References Cited

U.S. PATENT DOCUMENTS

| 3,720,814 A | 3/1973 | Klein |
| 4,441,809 A | 4/1984 | Dudley et al. |
| 4,796,198 A | 1/1989 | Boultinghouse et al. |
| 4,820,041 A | 4/1989 | Davidson et al. |
| 4,901,256 A | 2/1990 | McMurtry et al. |
| 5,100,229 A | 3/1992 | Lundberg et al. |

(Continued)

OTHER PUBLICATIONS

Depenthal, C. "Path tracking with IGPS," 2010 International Conference on Indoor Positioning and Indoor Navigation (IPIN), Zurich, Switzerland, Sep. 15-17, 2010.*

(Continued)

*Primary Examiner* — Mohammad Ali
*Assistant Examiner* — Jennifer L Norton
(74) *Attorney, Agent, or Firm* — Yee & Associates, P.C.

(57) ABSTRACT

A method for verifying completion of a task. Location coordinates of at least one location sensor within a work cell are obtained. At least one sensor is affixed to a tool used to operate on a feature of a structure to be assembled, fabricated or inspected. A virtual object locus is generated based on the location coordinates of the at least one location sensor. The virtual object locus corresponds to a computerized schematic of the structure to be assembled and represents of all possible locations of an object end of the tool within the work cell. One of a plurality of candidate features is identified as the most likely to be the feature operated on by the tool. The identification is based on a probability calculation for each of the candidate features that each respective candidate feature is the feature operated on by the tool.

6 Claims, 6 Drawing Sheets

(56) References Cited

U.S. PATENT DOCUMENTS

| | | | |
|---|---|---|---|
| 5,110,202 | A | 5/1992 | Dornbusch et al. |
| 5,189,626 | A | 2/1993 | Colburn |
| 5,208,763 | A | 5/1993 | Hong et al. |
| 5,294,970 | A | 3/1994 | Dornbusch et al. |
| 5,297,238 | A | 3/1994 | Wang et al. |
| 5,309,212 | A | 5/1994 | Clark |
| 5,579,102 | A | 11/1996 | Pratt et al. |
| 5,910,894 | A | 6/1999 | Pryor |
| 6,374,195 | B1 | 4/2002 | Li et al. |
| 6,381,006 | B1 | 4/2002 | Ramstrom |
| 6,400,452 | B1 | 6/2002 | Maynard |
| 6,437,860 | B1 | 8/2002 | Jappinen |
| 6,452,668 | B1 | 9/2002 | Pratt |
| 6,501,543 | B2 | 12/2002 | Hedges et al. |
| 6,519,029 | B1 | 2/2003 | Hedges et al. |
| 6,535,282 | B2 | 3/2003 | Hedges et al. |
| 6,545,751 | B2 | 4/2003 | Bellveau et al. |
| 6,606,528 | B1 | 8/2003 | Hagmeier et al. |
| 6,615,112 | B1 | 9/2003 | Roos |
| 6,618,133 | B2 | 9/2003 | Hedges et al. |
| 6,621,565 | B2 | 9/2003 | Pratt et al. |
| 6,630,993 | B1 | 10/2003 | Hedges et al. |
| 6,662,103 | B1 | 12/2003 | Skoinick et al. |
| 6,757,582 | B2 | 6/2004 | Brisson et al. |
| 6,862,497 | B2 | 3/2005 | Kemp et al. |
| 6,898,484 | B2 | 5/2005 | Lemelson et al. |
| 6,996,456 | B2 | 2/2006 | Cordell et al. |
| 7,055,233 | B1 * | 6/2006 | Hofer et al. .................. 29/430 |
| 7,209,041 | B2 * | 4/2007 | Hines et al. ................ 340/572.4 |
| 7,209,752 | B2 | 4/2007 | Myllymaki et al. |
| 7,212,120 | B2 | 5/2007 | Gudat |
| 7,570,006 | B2 | 8/2009 | Bretschneider |
| 8,050,486 | B2 | 11/2011 | Walton |
| 2004/0039483 | A1 | 2/2004 | Kemp et al. |
| 2005/0131635 | A1 | 6/2005 | Myllymaki et al. |
| 2007/0225834 | A1 | 9/2007 | Bretschneider |
| 2007/0265942 | A1 | 11/2007 | Freeman et al. |

OTHER PUBLICATIONS

USPTO non-final office action dated Dec. 10, 2010 regarding U.S. Appl. No. 11/408,754, 22 Pages.

USPTO non-final office action dated May 24, 2011 regarding U.S. Appl. No. 11/408,754, 12 Pages.

USPTO notice of allowance dated Feb. 28, 2012 regarding U.S. Appl. No. 11/408,754, 14 Pages.

Preliminary amendment dated Feb. 5, 2008 regarding U.S. Appl. No. 11/408,754, 14 Pages.

Response to office action dated Aug. 24, 2011 regarding U.S. Appl. No. 11/408,754, 13 Pages.

Response to restriction requirement dated Mar. 10, 2011 regarding U.S. Appl. No. 11/408,754, 11 Pages.

* cited by examiner

ASSEMBLY TASK VERIFICATION SYSTEM AND METHOD

This application is a divisional of application Ser. No. 11/408,754, filed Apr. 21, 2006, status allowed.

BACKGROUND INFORMATION

1. Field

The invention relates generally to tracking a location of an object, such as a tool, within an enclosed structure, such as a manufacturing facility.

2. Background

Tracking the location of a tool, such as drill or a torque tool, within a manufacturing facility can be of value for many reasons or purposes. For example, tracking the location of a tool used in the production of complex, high quality, high reliability, highly regulated parts can be of great value in assuring proper assembly. An example of such a tool might be a torque tool used to tighten the fasteners that hold the skin of an aircraft wing to the substructure. Aircraft assembly is highly regulated by the government with very strict quality and documentation requirements. Accordingly, assurances that the each nut, bolt, hole, rivet, etc. has been properly installed, in accordance with very tight specifications, must be satisfied and supporting documentation must be generated.

At least some known instrumented tools can record the data associated with the functionality of the tool, such as torque and number of rotations. However, such instrumented tools typically do not record or track positions or locations of the tool relative to the part being operated on by the tool, for example the aircraft wing skin and substructure. Information regarding the positions or locations of the tool relative the part being operated on can be very helpful in verifying performance of certain assembly operations. Generally, known indoor global positioning systems (GPS) systems can locate a sensor attached to the tool, but data processing limitations of the indoor GPS systems make them difficult to use for determining a particular feature, e.g., a hole or fastener, the tool is acting on, e.g. drilling or tightening. For such contemporary tool tracking systems to track specific features on which a tool is operating, a single sensor would have to be located at the point of interest on the tool, i.e., the part of the tool making contact with the particular feature. For example, the point of interest for a drill would be the tip of the drill bit. Having a sensor located at the point of interest on most tools would be impractical and render the tool unable to perform its intended function.

Two sensors can be attached collinearly with the point of interest on the tool, however, this can be cumbersome to implement in practice because it reduces flexibility of sensor placement. Additionally, indoor GPS typically involves the use of vector bars to define a point of space. However, to be useful for tracking the location of the tool's point of interest, the point of interest must be at the intersection of the vector bars. This requires specific placement of the sensor on the tool. But, with many tools such specific placement is not feasible due to the size, shape, weight or features of the tools.

SUMMARY

A method for verifying completion of a task is provided. In various implementations, the method includes obtaining location coordinates of at least one location sensor within a work cell. The at least one sensor is affixed to a tool used to operate on a feature of a structure to be assembled, fabricated or inspected. The method additionally includes generating a virtual object locus based on the location coordinates of the at least one location sensor. The virtual object locus corresponds to a computerized schematic of the structure to be assembled and represents all possible locations of an object end of the tool within the work cell. The method further includes identifying one of a plurality of candidate features as the most likely to be the feature operated on by the tool. The identification is based on a probability calculation for each of the candidate features that each respective candidate feature is the feature operated on by the tool.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention. Additionally, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION

The following description of the various embodiments is merely exemplary in nature and is in no way intended to limit the invention, its application or uses. Additionally, the advantages provided by the various embodiments, as described below, are exemplary in nature and not all embodiments provide the same advantages or the same degree of advantages.

Figure 1:
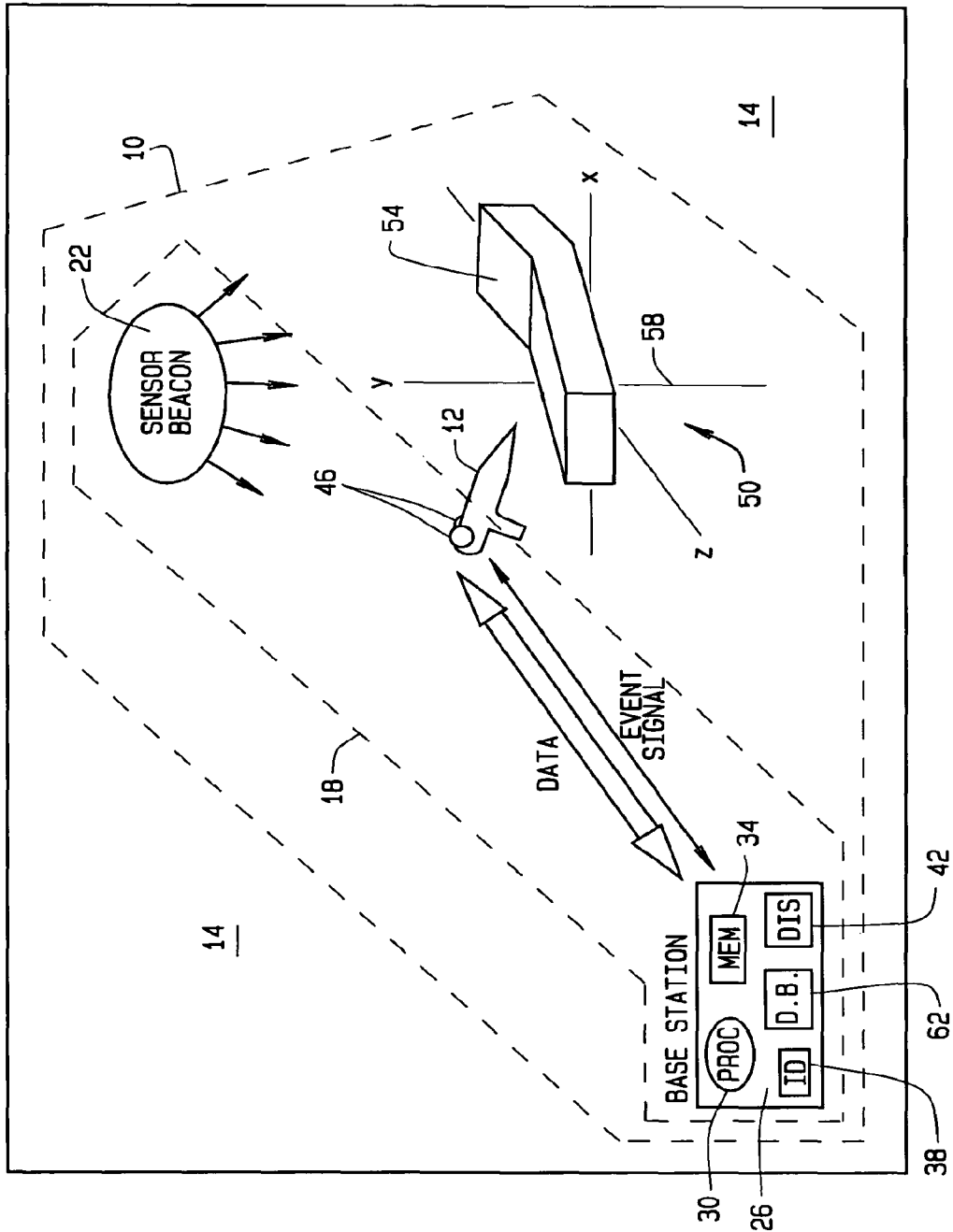
FIG. 1 is a block diagram of an assembly tracking verification system (ATVS), in accordance with various embodiments.

Referring to FIG. 1, an assembly task verification system (ATVS) 10 is shown for verifying performance of a particular assembly task or operation by a tool 12 within a localized environment 14. Although the present disclosure is described below in terms of an 'assembly task' verification system for verifying performance of an 'assembly task', it should be understood that the scope of the disclosure should not be limited to an 'assembly' task. More particularly, the phrase 'assembly task', as used herein, should be understood to mean any task or operation performed by the tool 12, within the localized environment 14, for which verification of the task is desired. For example, the phrase 'assembly task' can include such tasks as fabrication tasks, inspection tasks, assembly tasks, etc.

The tool 12 can be any tool or instrument utilized by an operator to perform a task, e.g., assembly task, whereby completion of the task is to be verified by the ATVS 10. For example, the tool 12 can be a drill, a torque tool, a pneumatic impact tool, a rivet gun, or any other tool or instrument utilized to perform a specified task. As used herein, the localized environment 14 can be any defined space suitable for employing an indoor object location system 18. For example, the localized environment 14 can be an indoor manufacturing facility, an outdoor construction site, or a pavilion-like covered work space. In various embodiments, the indoor object location system 18 comprises an indoor global position system (GPS). Furthermore, although the ATVS 10 will be described herein as employing an indoor GPS 18, it should be understood that any suitable indoor object location system 18 could be implemented and remain with the scope of the present disclosure.

In various embodiments, the indoor GPS 18 includes one or more sensor beacons 22 and one or more base stations 26. For clarity and simplicity, the one or more sensor beacons 22 and the one or more base stations 26 will be referred to herein in the singular, simply as the sensor beacon 22 and the base station 26, although it should be understood that each reference herein is intended to describe one or more sensor beacons 22 and one or more base stations 26.

The base station 26 is a computer-based device including a processor 30, e.g., a microprocessor, and at least one electronic storage device 34. The processor 30 can be any processor suitable to execute all functions of the base station 26. The electronic storage device(s) 34 can be any computer readable medium suitable for electronically storing such things as data, information, algorithms and/or software programs executable by the processor 30. For example, in various embodiments, the electronic storage device(s) 34 can be memory device(s) such a hard drive, EEPROM, Flash Memory, OTP memory or any other electronic data storage device or medium. In various other embodiments, the electronic storage device(s) 34 can be remotely located from the base station 26. Furthermore, in various embodiments the electronic storage device(s) 34 can be removably connectable to the base station 26. For example, the electronic storage device(s) 34 can be a USB hard drive, a Zip drive disk, a CDRW drive disk, a DVDR drive disk, a thumb drive or any other removable electronic storage device Further yet, in various embodiments, the base station 26 includes an input device 38, such as a keypad, a mouse, a stylus or a joy stick for inputting data and information to the base station 26 to be stored on the electronic memory device 34. Still further yet, in various embodiments, the base station 26 includes a display 42 for illustrating graphical and/or textual/numeric data and various other forms of information. Still even further yet, in various embodiments, the base station 26 can be wired or wirelessly connected or connectable to a remote computer based system (not shown). For example, the base station 26 can be wired or wirelessly connected or connectable to a remotely located server system, such that data, information, algorithms, operational commands for the assembly task verification system 10, software programs, or any other data can be communicated to and/or from the base station 26.

Figure 2:
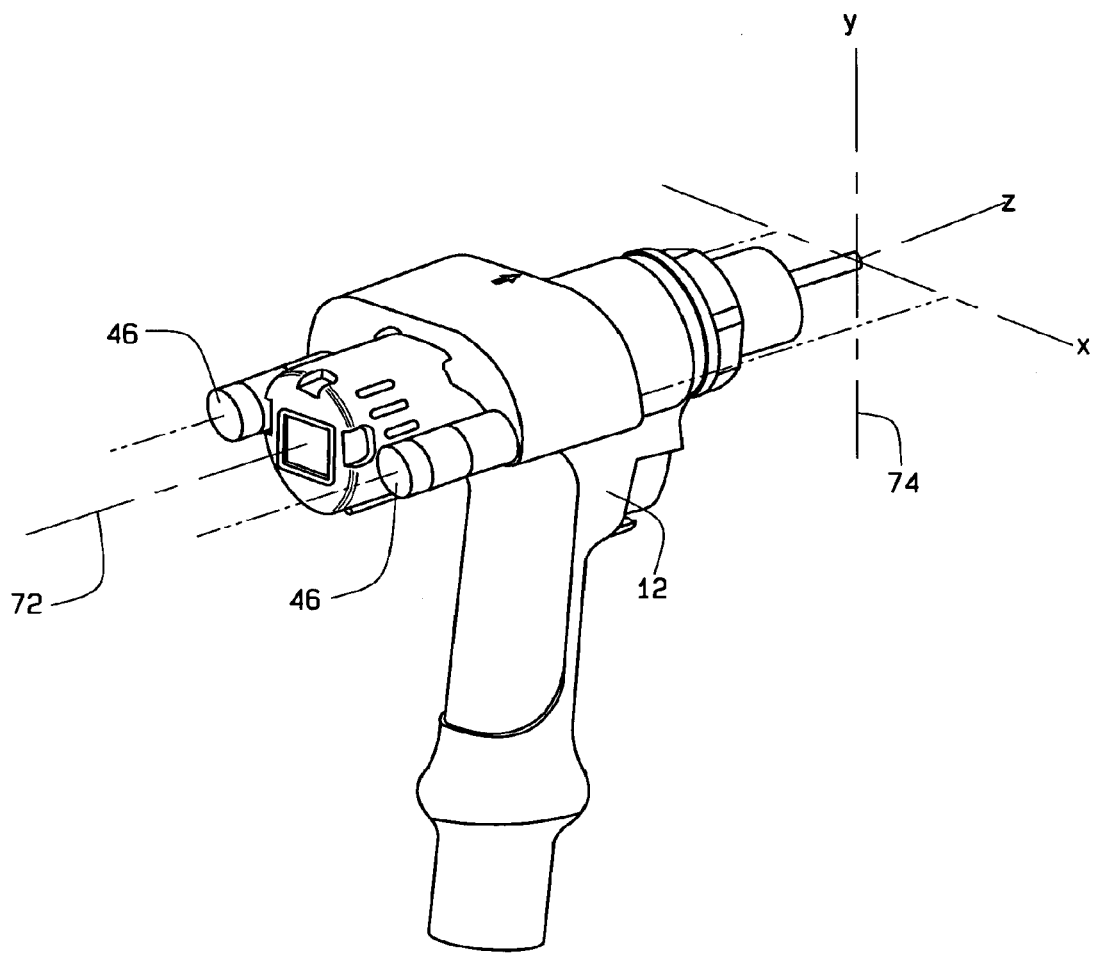
FIG. 2 is an exemplary illustration of a tool having at least one location sensor included in the ATVS system of FIG. 1 attached thereto, in accordance with various embodiments.

The ATVS 10 additionally includes at least one location sensor 46, best shown in FIG. 2, affixed to the tool 12 for wireless communication with the sensor beacon 22. Furthermore, the ATVS 10 includes a work cell 50 in which the operator performs an assembly task that is verified by the ATVS 10. The task to be verified can be any assembly task required to assemble any structure, part, component or assembly in accordance computerized assembly and design drawings or schematic, e.g., computer aided drafting (CAD) or Unigraphics drawings. For example, the task to be verified can be drilling a hole, tightening a bolt, tightening a screw or securing a rivet of an aircraft substructure, such as a wing assembly. For clarity of the present disclosure, the hole to be drilled, the bolt to be tightened, the screw to be tightened, the rivet to be secured, etc., are referred to herein below as 'features' operated on by the tool 12. Generally, any unique feature on the structure 54 that can be described mathematically in the computerized assembly and design drawings or schematic can be a feature. Also, for clarity of the present disclosure, the structure, part, component, assembly, etc., to be assembled will be referred to herein below simply as the 'structure' to be assembled and is shown and identified in FIG. 1 as the structure 54. Additionally, although the task to be performed is generally referred to herein in the singular, i.e., a single task, it should be understood that, in various embodiments, the utilization of the ATVS 10 can be used to verify a plurality of tasks. For example, the ATVS 10 can be utilized to verify that every hole required for securing a skin to an aircraft wing assembly is drilled and every rivet required to secure the skin to the wing assembly is secured within each hole.

The work cell 50 can be any space within the localized environment 14 used to assemble the structure 54, such as a space including an assembly jig for fixedly holding the structure 54 during assembly. In various embodiments, the work cell 50 can be a particular defined and dedicated area or space within the localized environment 14 specifically designated for assembly of the structure 54. For example, the work cell 50 can be a space having an assembly jig fixed to a floor of the localized environment 14 specifically designated for repetitious use in assembling various structures 54. In various other embodiments, the work cell 50 can be any area or space, moveable or temporarily fixed, within the localized environment 14 where assembly of the structure 54 is performed. For example, the work cell 50 can be an assembly jig mounted on wheels that can be moved to any location within the localized environment 14. Or, the work cell 50 can be a portion of an automated assembly line process within localized environment 14 where the work cell 50 and structure 54 move during assembly of the structure 54.

As described below, the ATVS 10 overlays a work cell coordinate system 58, e.g., a Cartesian coordinate system, on the structure 54. More particularly, the work cell coordinate system 58 is overlaid onto the structure in a fixed fashion such that throughout assembly of the structure 54 the relationship between the work cell's coordinate system 58 and the structure 54 is fixed and unchanged. Thus, if the structure 54 is moved, the work cell 50 moves with the structure 54, and relationship between the work cell coordinate system 58 and the structure 54 remains fixed and unchanged.

In various embodiments the base station electronic storage device 34 includes an ATVS algorithm executable by the processor 30 for verifying the completion of one or more assembly tasks. Additionally, in various embodiments, the base station 26 includes a data base 62 for storing data such as computerized assembly and design drawings or schematics of a plurality of different structures 54 to be assembled.

Figure 3:
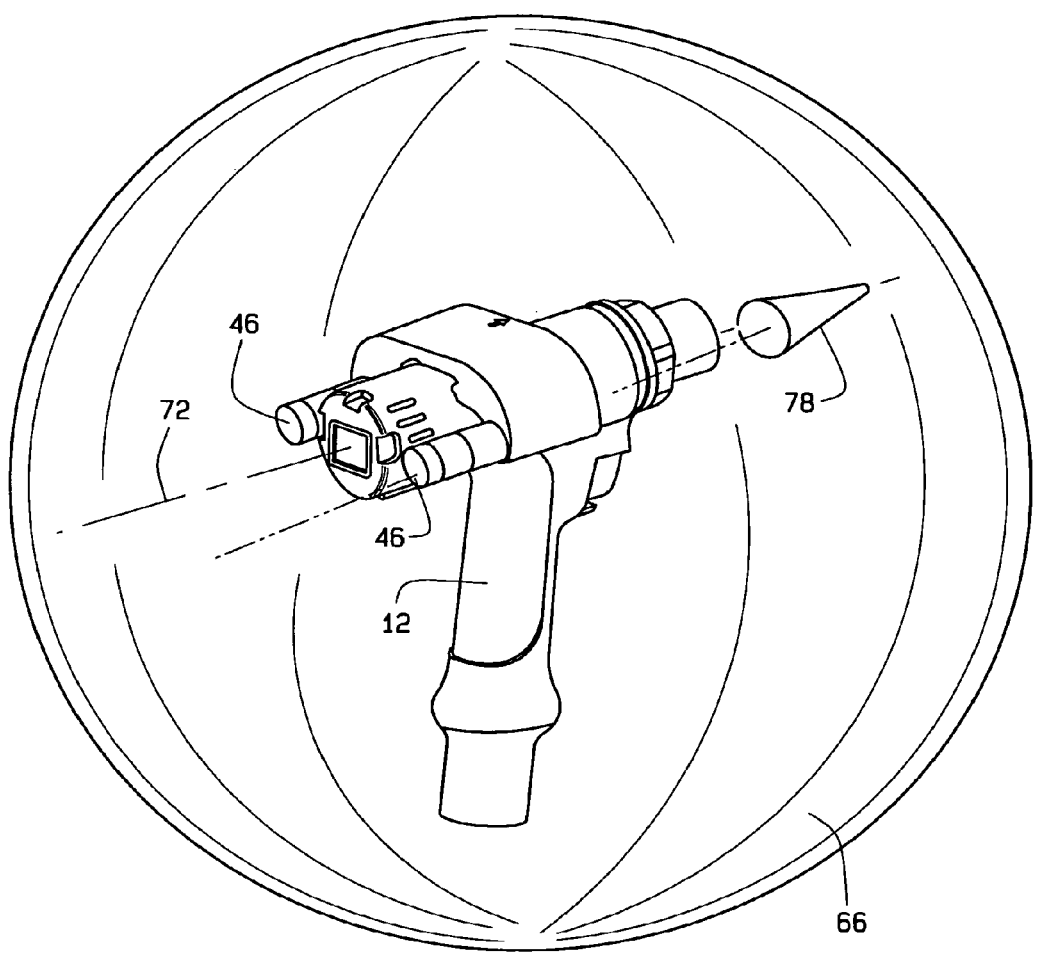
FIG. 3 is an exemplary illustration of a spherical object locus generated by the ATVS shown in FIG. 1, in accordance with various embodiments.
Figure 4:
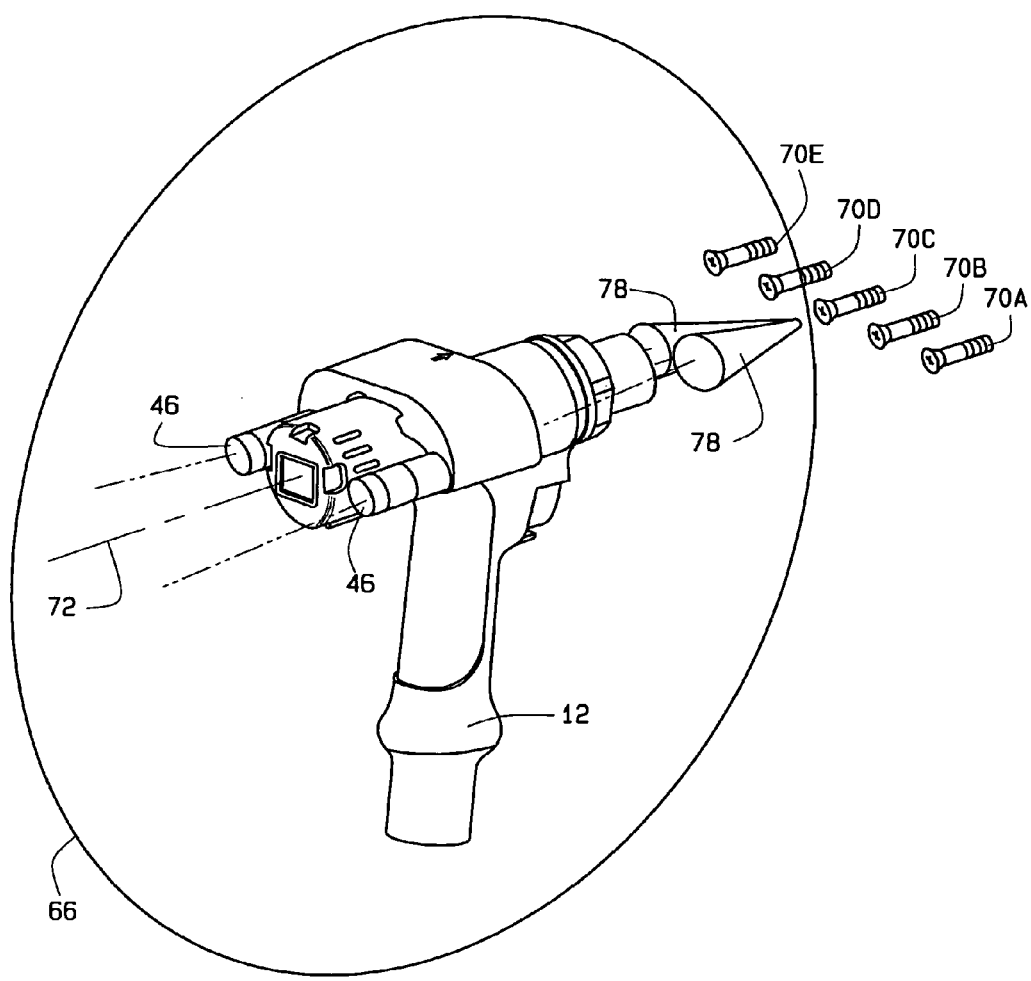
FIG. 4 is an exemplary illustration of a circular object locus generated by the ATVS shown in FIG. 1, in accordance with various embodiments.

Referring now to FIGS. 2, 3 and 4, generally, the ATVS 10 utilizes the indoor GPS system 18 to determine a location of the tool 12 upon receipt of an event signal from the tool 12. The event signal indicates to the base station 26 the completion of a task, e.g., the insertion and fastening of a rivet. Particularly, upon receipt of the event signal, the indoor GPS 18 reads or senses the location sensors 46 to accurately assess the location of the location sensors 46 within the work cell 50, e.g., accurate to within $\frac{1}{100}^{th}$ of an inch. Generally, the sensor beacon 22 emits timed laser pulses received by the location sensors 46. Upon completion of a task, along with the event signal, the location sensors 46 send location data, i.e., sensor readings, to the base station 26. The sensor readings are determined by the location sensors 46 based on the receipt of the timed laser pulses from the sensor beacon 22. The location data, i.e., sensor readings, provides the base station 26 with a three-dimensional location of the location sensors 46 within the work cell 50, with respect to the structure coordinate system 58

Based on the sensor readings, the base station 26 determines a locus 66 of possible location points within the work cell 50 for the object end of the tool 12, e.g., the tip of the tool 12 that contacts the feature to perform the task. The locus 66 of possible location points, within the work cell 50, for the object end of the tool 12 will be referred to herein as the 'object locus 66'. Then, accessing the computerized assembly and design schematic of the structure 54, and knowing an established location and orientation of the structure 54 within the work cell 50, with respect to the work cell coordinate system 58, the base station 26 generates a probability that various features are located within the object locus 66. The feature with the highest probability, over a predetermined threshold value, e.g., 50% is determined to be the feature operated on. Thus, the task of operating on that particular feature, e.g., inserting and securing a specific rivet, is verified. For example, as illustrated in FIG. 4, the base station 26 will calculate or generate a probability that each of the features 70A, 70B, 70C, 70D and 70E are within the object locus 66. If feature 70C is determined to have the highest probability in excess of a predetermined value, feature 70C is considered the feature operated on by the tool 12 at the time the event signal was sent, and therefore, the task of operating on feature 70C is verified by the ATVS 10.

In various embodiments the ATVS 10 can calculate/generate the probability of being within the object locus 66 for every feature designated in the computerized assembly and design drawings or schematics for the structure 54. The ATVS 10 can then determine which feature has the highest probability above the threshold to verify task completion. Alternatively, in other various embodiments the ATVS 10 can calculate/generate the probability of being within the object locus 66 for a select group of features for the structure 54, as described below, and then determine which feature of the select group has the highest probability above the threshold to verify task completion.

Although the various embodiments are often described herein in terms of the ATVS 10 or the base station 26 calculating or generating probabilities or having a direct affect on, or direct control of, verifying completion of tasks, it should be understood that it is the instructions generated by the execution of the one or more algorithms, via the processor 30 and the subsequent implementation of those instructions by the base station 26 that calculate or generate the probabilities and have a direct affect on, or direct control of, verifying task completion.

Referring particularly to FIG. 2, prior to execution of the ATVS algorithm, one or more sensors 46 are fixed to arbitrary positions on the tool 12 and calibrated to have known coordinates relative to the object end of the tool 12, e.g., the tip of the tool 12, and a line of action vector 72 of the tool 12. More particularly, a tool coordinate system 74 is established such that the origin of the coordinate system 74 is at the object end of the tool 12 and the axis of the line of action vector 72 (for example a vector representing the twist axis of a torque tool) is along an axis of the coordinate system 74. The locations of the location sensors 46, relative to the origin, i.e., the object end of the tool 12, are then measured and stored in the electronic storage device 34 as calibration data for the tool 12. Additionally, prior to execution of the ATVS algorithm, the location, placement and orientation of the structure 54 within the work cell 50, with respect to the work cell coordinate system 58, is determined and stored in the electronic storage device 34 as calibration data for the structure 54. In various embodiments the structure 54 is 'locked' into place within the work cell 50, i.e., mounted in a jig affixed to the floor of the localized environment 14. Thus, the location and orientation of the structure 54 within the work cell 50, with respect to the work cell coordinate system 58, can be determined using simple fixed measurements. The structure 54 may also be mounted in a movable jig and the location and orientation of the structure 54 within the work cell 50, with respect to the work cell coordinate system 58, can be determined using a laser measurement system. The data identifying the location and orientation of the structure 54 can then be provided to the electronic storage device 34.

Upon activation of the ATVS 10 and execution of the ATVS algorithm, the structure calibration data is converted to the units and coordinate system employed in the computerized assembly and design drawings or schematic, e.g., CAD or Unigraphics units and coordinates. The location sensors 46 are then tracked within the work cell 50 by the indoor GPS system 18 as the operator uses the tool 12 to perform the various stipulated tasks. When the tool 12 performs an intended action, an event signal is sent to the base station 26. For example, the intended action of a torque tool can be when the torque generated by the torque tool reaches a certain level indicating that a fastener has been tightened to a desired level of torque. Thus, each time the torque tool tightens a fastener to the desired torque level, an event signal is sent to the base station 26. Or, for example, the intended action of drill can be when the torque generated by the drill drops significantly after reaching a certain torque level, thereby indicating that the drill bit has cut through part being drilled and a hole has been created. Thus, each time the drill cuts through the part, creating a hole, an event signal is sent to the base station 26.

When the tool 12 performs an intended action and an event signal is sent, the location of all the visible location sensors 46 on the tool 12 are determined by the respective location sensors 46 and captured by the base station 26. Thus, upon each event signal, the indoor GPS 18 accurately determines the location of the tool 12 within the work cell 50. For example, the indoor GPS 18 can determine the location of the tool 12 within the work cell 50 to within approximately $\frac{1}{100}^{th}$ of an inch. Execution of the ATVS algorithm then utilizes the structure calibration data to correlate the location of the tool 12 with the computerized assembly and design drawings or schematic. That is, the location of the tool 12 with respect to the structure 54 within the work cell coordinate system 58 is mathematically converted to a representative or 'virtual' location of the tool 12 with respect to the structure 54 within the computerized assembly and design drawings or schematic. The ATVS algorithm also utilizes the tool calibration data to determine the object locus 66 of all possible location points, within the work cell 50, of the object end of the tool 12. Additionally, the ATVS algorithm also utilizes the tool calibration data to determine all possible lines of action vectors 72 for the object end of the tool 12. The object locus 66 and line of action vectors 72 are then also correlated with the computerized assembly and design drawings or schematic. That is, the object locus 66 and line of action vectors 72 are mathematically converted to a representative or 'virtual' object locus and 'virtual' line of action vectors within the computerized assembly and design drawings or schematic.

The ATVS algorithm can then compare the values, i.e., coordinates, of all points within the virtual object locus and the virtual line of action vectors with a list of feature data, i.e., coordinates of each feature of the structure 54. The feature data is provided by, or derived from, the computerized assembly and design drawings or schematic. Based on these comparisons, a probability value is calculated for each feature. The probability values indicate the closeness of the coordinates for each feature to the coordinates and line of action vector of each point within the virtual locus. More particularly, the probability values indicate the probability that each feature is the feature operated on at the time the event signal was generated. The feature having coordinates closest to the coordinates and line of action vector of any of the virtual object locus points, will have the highest probability value and thus, will be determined to be the feature operated on. That is, the feature that most closely matches a possible tool tip location and orientation is the most likely feature that was operated upon. Accordingly, verification of the task of operating on the feature with highest probability will be accomplished. In exemplary embodiments, most features will have a probability of approximately zero, because it is just physically impossible that their coordinates match the coordinates and line of action vectors of any of the points within the virtual locus. However, the feature that was actually operated on at the time of the event signal have a probability of approximately 90% or greater.

In various embodiments, as illustrated in FIGS. 1 through 4, the ATVS 10 includes at least two location sensors 46. When the event signal is generated, based on the timed laser pulses from the sensor beacon 22, each location sensor 46 determines its three-dimensional location within the work cell 50, as described above. If the 'line-of-sight' between the sensor beacon 22 and any of the location sensors 46 is 'blocked', i.e., the timed laser pulses are blocked or prevented from reaching a location sensor 46, at the time of the event signal, then location data can only be captured for the remaining 'unblocked' location sensor(s) 46. Because the ATVS 10 uses probabilities to determine task verification, even with a location sensor 46 'blocked', the ATVS 10 can accurately verify completion of the tasks, as described herein. Therefore, upon each event signal, the ATVS algorithm uses location data readings from all 'unblocked' and/or partially 'blocked' location sensors 46 to generate the object locus 66 and the line of action vectors 72.

For example, referring to FIG. 3, if a single 'unblocked' location sensor 46 provides a location reading to the base station 26, then the points of the object locus 66 describe a sphere with each point on the sphere corresponding to a cone 78 that describes the possible line of action vectors 72 of the tool 12. As a further example, referring to FIG. 4, if two location sensors 46 are 'unblocked' and provide location readings to the base station 26, then the points of the object locus 66 describe a circle with each point on the circle corresponding to one of two cones 78 that describe the possible line of action vectors 72 of the tool 12. If a sufficient amount of location data is captured, e.g., if three location sensors 46 fully located are 'unblocked', or four sensors partially 'blocked', then the object locus 66 of tool tip locations reduces to a single point, and single line of action vector, such that the location and orientation the tool 12 tip is fully known.

In various embodiments, execution of the ATVS algorithm compares each candidate feature, e.g., features 70A, 70B, 70C, 70D and 70E, in turn with each point and line of action vector of the virtual object locus. This gives a distance and angle of each candidate feature to each point in the virtual object locus. The distance and angle are then used to determine the probability that the tool tip location and orientation matches that of each candidate feature. In this way, a probability is calculated for each candidate feature, and the candidate features with higher probability values are closer matches. If the probability value is above a certain threshold, e.g., 50%, and sufficiently above the candidate feature with the next highest probability, then there is a high likelihood that the particular candidate feature is the feature operated on at the time of the event signal.

Figure 5:
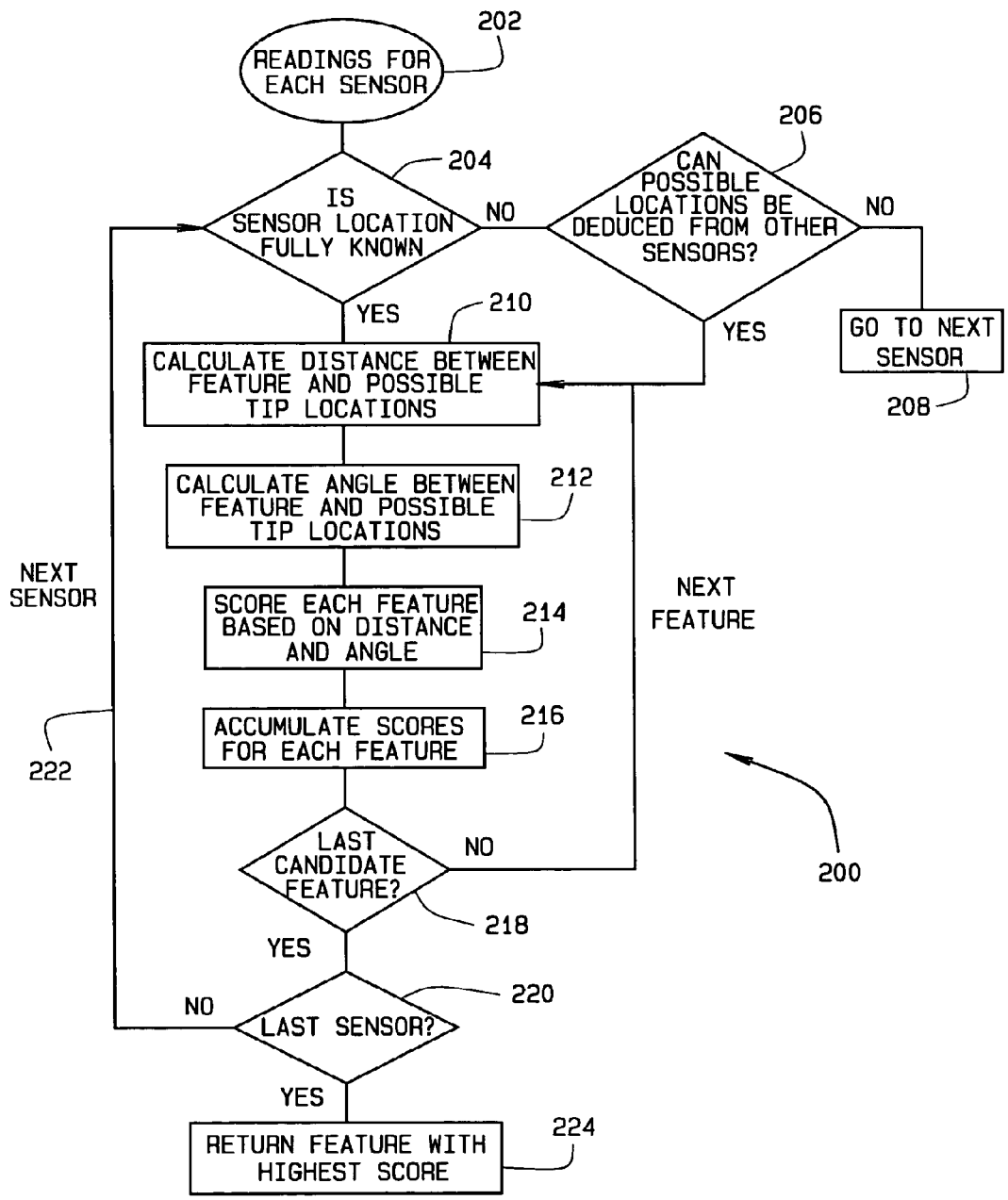
FIG. 5 is a flow chart illustrating an exemplary operation of the ATVS shown in FIG. 1, in accordance with various embodiments.

Referring now to FIG. 5, a flow chart 200 is provided illustrating an exemplary operational process of the ATVS 10, in accordance with various embodiments. Upon receipt of an event signal, the base station 26 captures location data, i.e., sensor readings, for each location sensor 46, as illustrated at 202. Execution of the ATVS algorithm then sequentially analyzes the sensor readings for each location sensor 46. Beginning with a first location sensor 46, the ATVS algorithm determines if the location of the first location sensor 46 is fully known, i.e., whether the first location sensor is 'unblocked', as indicated at 204. If the first location sensor 46 is not 'unblocked', the ATVS algorithm determines whether a possible location of the first location sensor 46 can be determined by first location sensor 46 reading, i.e., whether the first sensor is partially 'blocked', as indicated at 206. If the first location sensor 46 is completely 'blocked', the ATVS algorithm begins the same analysis at 204 for a second location sensor 46, as indicated at 208.

However, if the first location sensor 46 is either determined to be 'unblocked', at 204, or partially 'blocked', at 206, the ATVS algorithm calculates the distance between each point in a virtual object locus 66 for the first location sensor 46 and a first candidate feature, as indicated at 210. Next, the angle between each point in the first location sensor 46 virtual object locus 66 and the first candidate feature, as indicated at 212. A probability score is then generated for the first candidate feature, based on the distance and angle between each point in the first location sensor 46 virtual object locus 66 and the first candidate feature, as indicated at 214. The probability score for the first candidate feature is then stored in a register or accumulator (not shown) of the base station 26, as indicated at 216. The ATVS algorithm then determines whether the first candidate feature is the last candidate feature, as indicated at 218. If not, the ATVS algorithm generates a probability score for a second, and all subsequent, candidate features and stores the probability score for each candidate feature as indicated at 210 through 218. Upon generation of a probability score for the last candidate feature, the ATVS algorithm determines whether the first location sensor 46 is the last location sensor 46 that is fully or partially known, i.e., 'unblocked' or partially 'blocked', as indicated at 220.

If the first location sensor 46 is not the last location sensor 46, the ATVS algorithm begins the same analysis of sensor readings for a second location sensor 46, as indicated at 222. Then as described above with regard to the first location sensor 46, the ATVS algorithm generates a probability score for each candidate feature relative to a second location sensor 46 object locus 66, as indicated at 210 through 214. The probability score for each candidate feature relative to the second location sensor 46 object locus 66 is then added to the probability scores for that candidate feature stored in the register, and the accumulated scores for each candidate feature then replace the prior probability scores in the register, as indicated at 216. The generation and accumulation of the probability scores for each candidate feature, relative to virtual loci 66 for each location sensor 46 is completed for each location sensor 46, as described at 210 through 220. After all probability scores are accumulated, as described above, the ATVS algorithm returns the candidate feature with the highest probability score, as indicated at 224, which is considered to be the feature operated on at the time of the event signal.

As illustrated in FIG. 5, in various embodiments, a cost function is used to verify task completion. The cost function is a weighted linear function combining position and orientation of the points in the virtual locus 66. For example, for an exact match the cost function gives a score of 1, for matches above a certain upper threshold, e.g., 40%, but not an exact match, the cost function gives a score between 0 and 1, and for poor matches below a certain lower threshold, e.g. 40%, the cost function gives a score of 0. The thresholds used are sized based on the uncertainty of measurement of location sensor 46 reading relative to the features of interest. For example, if the candidate features are closely spaced, e.g., ¼ of an inch apart, then the upper and lower thresholds will be set to higher values to achieve a high level of confidence that the candidate feature identified as the feature operated on is actually the feature operated on. However, if the candidate features are further spaced apart, e.g., 1 foot apart, the level of the thresholds do not need to be as high to achieve a high level of confidence that the candidate feature identified as the feature operated on is actually the feature operated on.

Figure 6:
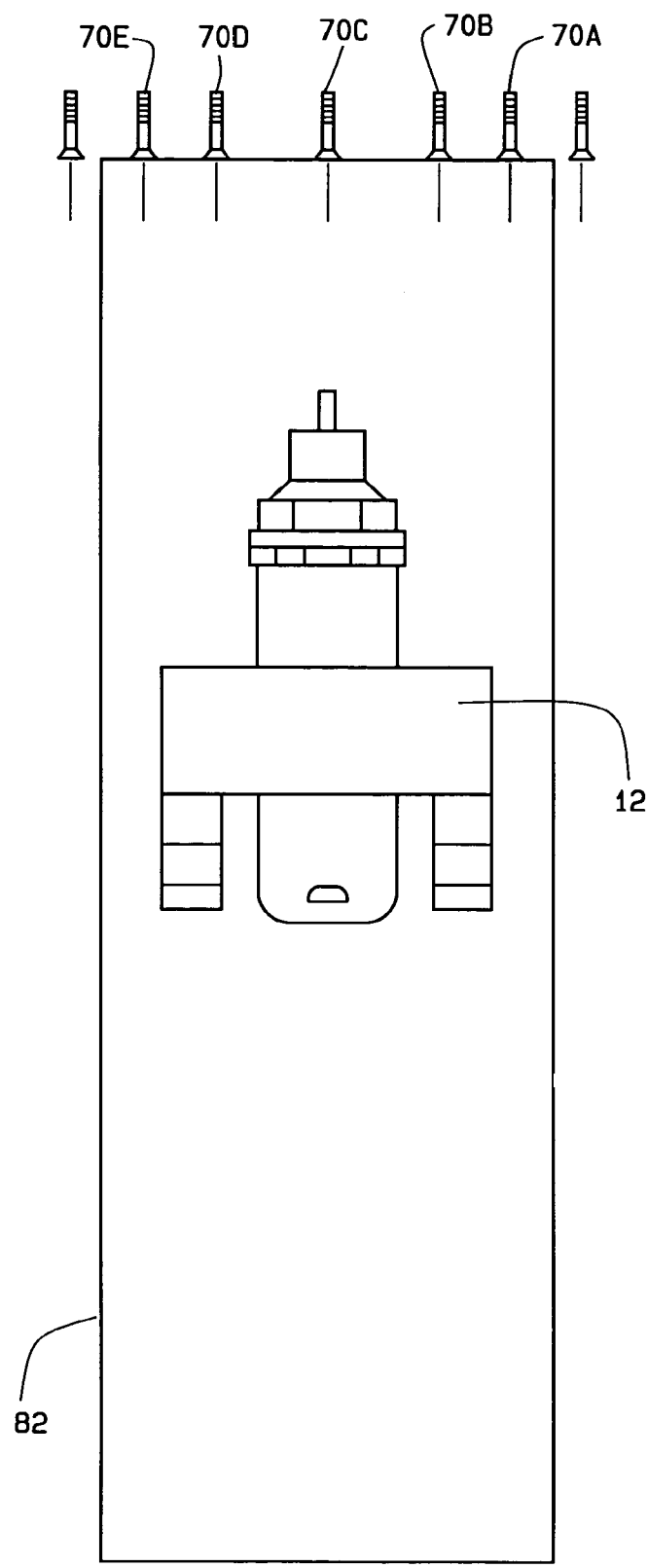
FIG. 6 is an exemplary illustration of a bounding volume generated by execution of a ATVS algorithm used by the ATVS system shown in FIG. 1.

Referring now to FIG. 6, in various embodiments, the time complexity of calculations performed during the execution of the ATVS algorithm can be reduced by only analyzing features that fall within a generated bounding volume 82. The bounding volume 82 is a select set of candidate features. This select set of candidate features within the bounding volume is defined based on the location reading of any one of the location sensors 46 that is 'unblocked'. The ATVS algorithm selects a certain number of features that are the closest to location coordinates of the selected location sensor 46, e.g., features 70A, 70B, 70C, 70D and 70E. The ATVS algorithm then only analyzes the probability that the selected candidate features are the features operated on. In this way features that are outside of the bounding volume 82 are rejected as impossible prior to calculating the probability on the remaining candidate features.

In various other embodiments, the base station 26 is an intermediate computer based subsystem communicatively linked between the location sensors 46 and a second computer-based subsystem (not shown). In such a case, the second computer-based subsystem includes a processor, an electronic storage device, and in various embodiments, a data base, for storing and executing the ATVS algorithm, as described above. Thus, the base station 26 receives data and information, e.g., tool location data, from the location sensors 46, and also communicates with a second computer based subsystem that calculates probabilities to determine verification of the completion of one or more assembly tasks, as described herein.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An assembly task verification system (ATVS), said system comprising:
   a work cell within a localized environment, the work cell utilized for assembling a structure using a tool configured to operate on a feature of a structure to be assembled;
   an indoor global positioning system configured to use vector bars to define a point of space for locating at least one location sensor affixed to the tool within the work cell to provide three-dimensional location coordinates of the at least one location sensor; and
   an indoor object detection system base station comprising at least one sensor beacon and a base station communicatively linked to the at least one location sensor, the base station configured to:
   acquire location coordinates from the at least one locations sensor within the work cell upon receipt of an event signal from the tool and
   identify one of a plurality of candidate features as the feature operated on by the tool at the time the event signal was received based on a probability calculation for each of the candidate features that each respective candidate feature is the feature operated on by the tool.

2. The system of claim 1, wherein the base station is further configured to generate a virtual object locus based on the location coordinates of the at least one location sensor, the virtual object locus corresponding to a computerized assembly schematic of the structure to be assembled and representative of all possible locations of an object end of the tool within the work cell at the time of receipt of the event signal.

3. The system of claim 2, wherein to identify one of the plurality of candidate features as the most likely to be the feature operated on by the tool, the base station is configured to calculate a probability that the location of each candidate feature indicated in the computerized assembly schematic matches the location of each point within the virtual object locus.

4. The system of claim 2, wherein the candidate features include every feature of the structure indicated by the computerized assembly schematic.

5. The system of claim 2, wherein the candidate features include a select set of all the features indicated by the computerized assembly schematic.

6. The system of claim 1, wherein the assembly task comprises one of a fabrication task and an inspection task.

\* \* \* \* \*